US011599743B2

(12) United States Patent
Chen

(10) Patent No.: US 11,599,743 B2
(45) Date of Patent: Mar. 7, 2023

(54) METHOD AND APPARATUS FOR OBTAINING PRODUCT TRAINING IMAGES, AND NON-TRANSITORY COMPUTER-READABLE STORAGE MEDIUM

(71) Applicant: BEIJING BAIDU NETCOM SCIENCE AND TECHNOLOGY CO., LTD., Beijing (CN)

(72) Inventor: Kaibing Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 425 days.

(21) Appl. No.: 16/865,733

(22) Filed: May 4, 2020

(65) Prior Publication Data

US 2021/0073580 A1 Mar. 11, 2021

(30) Foreign Application Priority Data

Sep. 5, 2019 (CN) .......................... 201910839137.9

(51) Int. Cl.
*G06K 9/62* (2022.01)
*G06F 16/957* (2019.01)
*G06F 16/951* (2019.01)

(52) U.S. Cl.
CPC ......... *G06K 9/6256* (2013.01); *G06F 16/951* (2019.01); *G06F 16/957* (2019.01); *G06K 9/6232* (2013.01); *G06K 9/6267* (2013.01)

(58) Field of Classification Search
CPC .. G06K 9/6256; G06K 9/6232; G06K 9/6267; G06F 16/957; G06F 16/951
See application file for complete search history.

(56) References Cited

U.S. PATENT DOCUMENTS 9,454,607 B1 * 9/2016 Amacker .............. H04L 67/568
9,633,363 B2 * 4/2017 Price .................. G06Q 30/0246
9,665,959 B2 * 5/2017 Hatano .................. G06V 20/30
(Continued)

FOREIGN PATENT DOCUMENTS

CN 102609718 A 7/2012
CN 105528374 A 4/2016
(Continued)

OTHER PUBLICATIONS

Office Action for Chinese Application No. 201910839137.9, dated Oct. 9, 2021, 8 pages.

*Primary Examiner* — Mia M Thomas
(74) *Attorney, Agent, or Firm* — Lippes Mathias LLP

(57) ABSTRACT

The present disclosure provides a method and an apparatus for obtaining product training images, and a storage medium. The method includes: obtaining product images on each of product webpages in an e-commerce website, and determining a product feature vector of each product image on the product webpage; dividing the product images on the product webpage, and determining a target image set of the product webpage according to an image dividing result; classifying target image sets of the product webpages according to the average product feature vector to obtain at least one type of image set; and generating the product training images according to the at least one type of image set.

13 Claims, 5 Drawing Sheets

(56) References Cited

U.S. PATENT DOCUMENTS

| | | | | |
|---|---|---|---|---|
| 11,182,440 | B2* | 11/2021 | Sweeney | G06Q 30/0277 |
| 11,328,026 | B2* | 5/2022 | Nguyen | G06N 20/00 |
| 2010/0313250 | A1* | 12/2010 | Chow | H04L 51/04 |
| | | | | 707/E17.115 |
| 2012/0259882 | A1* | 10/2012 | Thakur | G06F 16/9535 |
| | | | | 707/E17.074 |
| 2015/0310100 | A1* | 10/2015 | Bursey | G06F 16/951 |
| | | | | 707/706 |
| 2016/0275372 | A1* | 9/2016 | Goodwin | G06K 9/6292 |
| 2017/0364492 | A1* | 12/2017 | Pushnyakov | G06F 16/951 |
| 2018/0181842 | A1* | 6/2018 | Liao | G06V 10/764 |
| 2019/0034531 | A1* | 1/2019 | Bosarge | G06F 3/017 |
| 2019/0034541 | A1* | 1/2019 | Bosarge | G06F 16/951 |
| 2019/0197330 | A1* | 6/2019 | Mahmoud | G06N 3/0454 |
| 2019/0295114 | A1* | 9/2019 | Pavletic | G06K 9/6256 |
| 2019/0332358 | A1* | 10/2019 | Ganesh | G06F 16/958 |
| 2020/0142978 | A1* | 5/2020 | Salokhe | G06V 10/255 |
| 2020/0272902 | A1* | 8/2020 | Feng | G06V 30/274 |
| 2020/0357026 | A1* | 11/2020 | Liu | G06Q 30/0271 |
| 2021/0117484 | A1* | 4/2021 | Sollami | G06F 40/44 |
| 2021/0192004 | A1* | 6/2021 | Wang | H04L 65/612 |
| 2021/0232621 | A1* | 7/2021 | Jain | G06N 20/00 |
| 2021/0279514 | A1* | 9/2021 | Turcot | G06V 20/597 |

FOREIGN PATENT DOCUMENTS

| | | |
|---|---|---|
| CN | 106874923 A | 6/2017 |
| CN | 107862561 A | 3/2018 |
| CN | 107870975 A | 4/2018 |
| CN | 108536513 A | 9/2018 |
| CN | 108984577 A | 12/2018 |
| CN | 109543730 A | 3/2019 |

* cited by examiner

METHOD AND APPARATUS FOR OBTAINING PRODUCT TRAINING IMAGES, AND NON-TRANSITORY COMPUTER-READABLE STORAGE MEDIUM

CROSS-REFERENCE TO RELATED APPLICATION

The present application is based upon and claims priority to Chinese Patent Application No. 201910839137.9, filed on Sep. 5, 2019, the entirety contents of which are incorporated herein by reference.

TECHNICAL FIELD

The present disclosure mainly relates to a field of computer technologies, and more particularly, to a method and apparatus for obtaining product training images, and a non-transitory computer-readable storage medium.

BACKGROUND

Product retrieval is an important technology, which is applicable for product image recognition. Product image recognition help users to quickly find the product they want and recommends the right product. In product retrieval, accurate product recognition of the target image uploaded by the user through a pre-established product recognition model is very important for quickly finding the desired product. However, in the process of establishing the product recognition model, a large number of training sample images consistent with the distribution of real scene are required.

In the related art, if tens of millions or hundreds of millions of training data is acquired, the cost of manually labeling is quite large. Therefore, how to quickly generate training data consistent with the distribution of real scenes is a problem that needs to be solved urgently.

SUMMARY

Embodiments of the present disclosure provide a method and apparatus for obtaining product training images, a computer device and a storage medium. Embodiments of the present disclosure provide a method for obtaining product training images. The method includes: obtaining product images on each of product webpages in an e-commerce website, and determining a product feature vector of each product image on the product webpage; for each product webpage, according to the product feature vector of each product image on the product webpage, dividing the product images on the product webpage into at least one image set of the product webpage, and determining a target image set of the product webpage with the largest number of product images from the at least one image set; determining an average product feature vector of the target image set according to product feature vectors of the product images in the target image set of the product webpage; classifying target image sets of the product webpages according to the average product feature vector to obtain at least one type of image set; and generating the product training images according to the at least one type of image set.

Embodiments of the present disclosure provide an apparatus for obtaining product training images. The apparatus includes: one or more processors; a memory storing instructions executable by the one or more processors; in which the one or more processors are configured to: obtain product images on each of product webpages in an e-commerce website; determine a product feature vector of each product image on the product webpage; according to the product feature vector of each product image on the product webpage, divide the product images on the product webpage into at least one image set of the product webpage, and determine a target image set of the product webpage with the largest number of product images from the at least one image set; determine an average product feature vector of the target image set according to product feature vectors of the product images in the target image set of the product webpage; classify target image sets of the product webpages according to the average product feature vector to obtain at least one type of image set; and generate the product training images according to the at least one type of image set.

Embodiments of the present disclosure provide a non-transitory computer-readable storage medium having a computer program stored thereon, when the program is executed by a processor, a method for obtaining product training images is implemented. The method includes: obtaining product images on each of product webpages in an e-commerce website, and determining a product feature vector of each product image on the product webpage; for each product webpage, according to the product feature vector of each product image on the product webpage, dividing the product images on the product webpage into at least one image set of the product webpage, and determining a target image set of the product webpage with the largest number of product images from the at least one image set; determining an average product feature vector of the target image set according to product feature vectors of the product images in the target image set of the product webpage; classifying target image sets of the product webpages according to the average product feature vector to obtain at least one type of image set; and generating the product training images according to the at least one type of image set.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions, in which.

DETAILED DESCRIPTION

Figure 1:
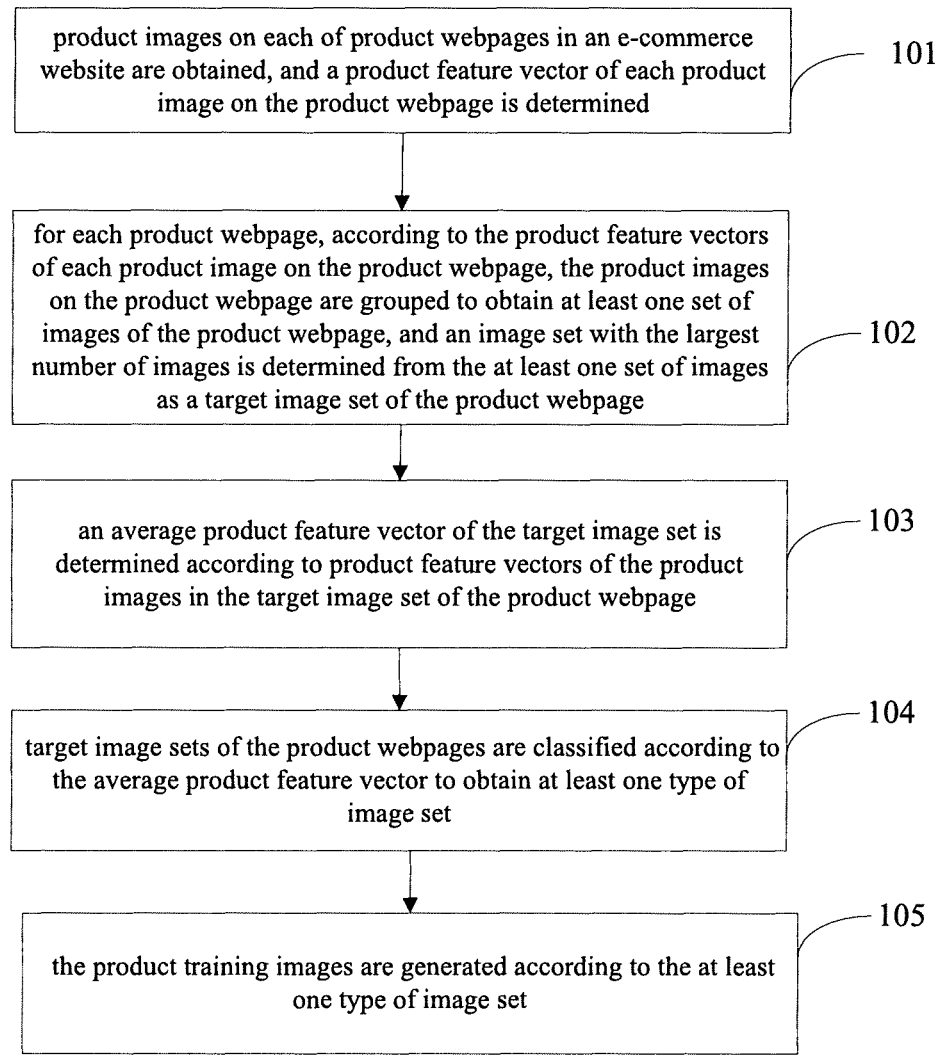
FIG. 1 is a flowchart of a method for obtaining product training images according to an embodiment of the present disclosure.

Embodiments of the present disclosure are described in more detail below with reference to the accompanying drawings. The same or similar elements and the elements having same or similar functions are denoted by like reference numerals throughout the descriptions. It should be understood that the drawings and embodiments of the present disclosure are for exemplary purposes only, and are not intended to limit the protection scope of the present disclosure.

The method and apparatus for obtaining product training images, the computer device and the storage medium according to the embodiments of the present disclosure are described in more detail below with reference to the accompanying drawings.

With the solutions provided in the present disclosure, after all product images on each of product webpages in an e-commerce website are obtained, by considering a product feature vector of each product image on each product webpage, all the product images on the corresponding product webpage are divided into at least one image set of the product webpage, and the product webpage with the largest number of product images is determined from the at least one image set as a target image set. After that, by considering product feature vectors of the product images in the target image set of each product webpage, an average product feature vector of each target image set is determined. Moreover, according to the average product feature vector, target image sets of all product webpages are classified to obtain at least one type of image set. The product training images are generated according to the at least one type of image set. Therefore, with the proposed method, all product images on the product webpage are combined considered to generate product training images, which can may quickly obtain such that a large number of training images consistent with the distribution of real scene are obtained quickly, thereby reducing the trouble of manually generating training images consistent with the distribution of real scene, and improving efficiency of obtaining training images consistent with the distribution of real scene, thus a good product recognition model for product recognition may be trained.

FIG. 1 is a flowchart of a method for obtaining product training images according to an embodiment of the present disclosure. It is noted that the method for obtaining product training images according to the embodiments of the present disclosure may be executed by the apparatus for obtaining product training images according to the embodiments of the present disclosure. The apparatus is configured in a computer device to realize the construction of product training images consistent with the distribution of real scenes based on the product images obtained from the product webpage in the e-commerce website.

As illustrated in FIG. 1, the method for obtaining product training images includes the following steps.

At step 101, product images on each of product webpages in an e-commerce website are obtained, and a product feature vector of each product image on the product webpage is determined.

In the embodiment, through webpage data capturing programs, all images on each of product webpages in an e-commerce website may be captured to obtain the product images on each product webpage in the e-commerce website.

It is noted that, the e-commerce website in the embodiment may be any e-commerce website, for example, the e-commerce website may be a certain e-commerce website providing an online retail platform.

It is understood that, in actual applications, for some product webpages, sometimes there is no comments data on the corresponding product webpage, that is, the corresponding product webpage only provides product main image. For some product webpages, not only the product main images but also an image of the product purchased and received by the user when the user makes comments on the received product are present in the comments area. Therefore, in the embodiment, all the product images on the product webpage may include a product main image, or a product main image and an image of a purchased product.

The product main image refers to a main image of the product, which is used to introduce the product.

The image of the purchased product refers to the product image used by the user when making comments on the product. In other words, the purchased product is an image of the real product captured by the user or an image of the product uploaded to the comments area by the user.

In the embodiment, in order to accurately represent the product feature vector in the product image, the product feature vector of each product image on the product webpage may be determined by: for each product webpage, performing a product main body detection on each product image on the product webpage to obtain a product main body area of each product image; and according to a preset product model, performing feature extraction on the product main body area of each product image to obtain the product feature vector of each product image.

The product feature vector of the product image is used to represent the product feature of the product image.

At step 102, for each product webpage, according to the product feature vectors of each product image on the product webpage, the product images on the product webpage are grouped to obtain at least one set of images of the product webpage, and an image set with the largest number of images is determined from the at least one set of images as a target image set of the product webpage.

In practical applications, when a user makes comments on the product, the product image used by the user may be inconsistent with the product image on the product webpage. That is, the images on the product webpage are not necessarily related to the product. Therefore, in the embodiment, for each product webpage, according to the product feature vector of each product image on this product webpage, the product images on the product webpage are divided into several sets, and a target image set of the product webpage with the largest number of product images is determined according to the divided result. Therefore, the images on the product webpage are refined, and the images that are not related to the product on the product webpage are filtered out, which lays the foundation for subsequent generation of highly accurate product training images.

Figure 2:
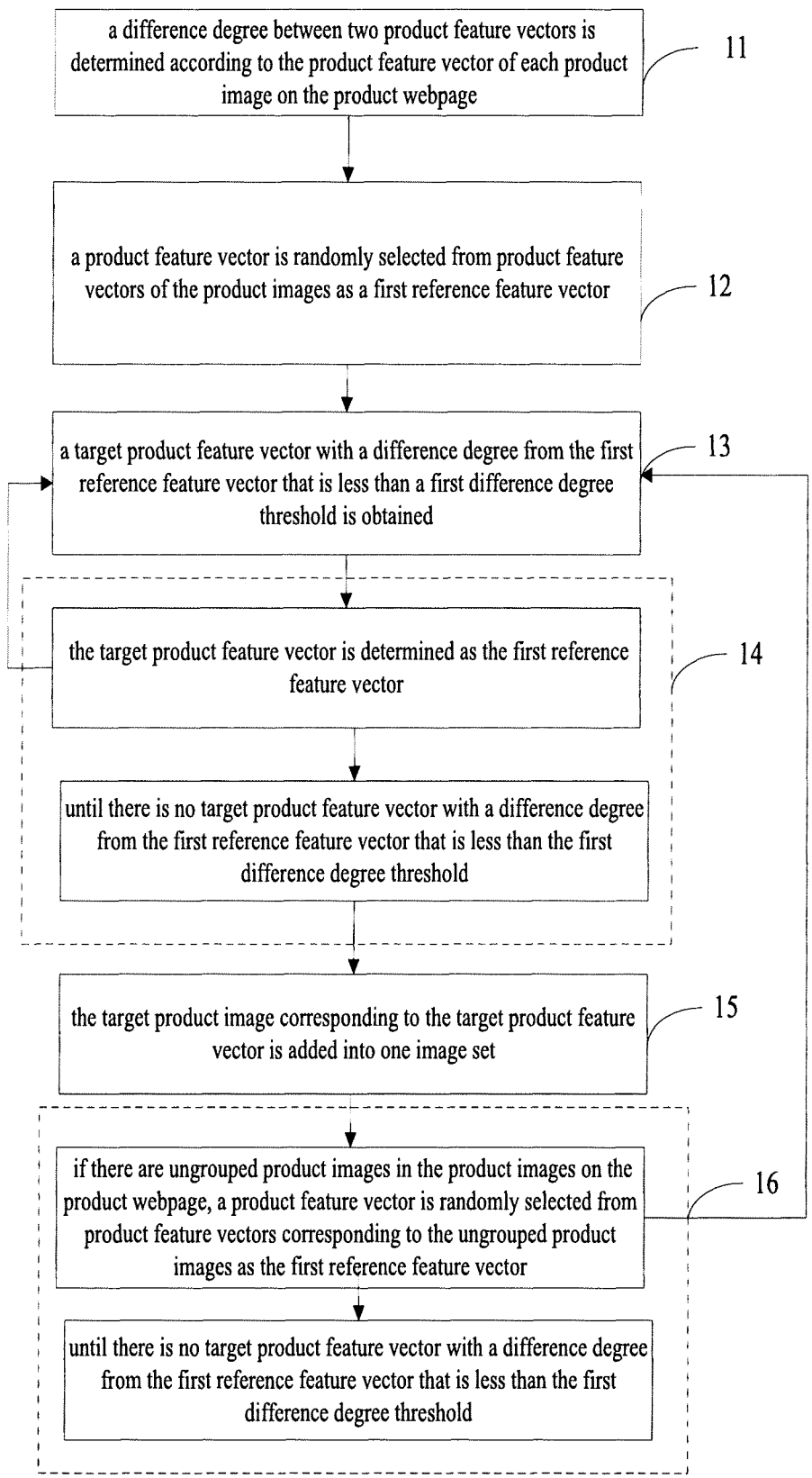
FIG. 2 is a detailed flowchart of step 102 in the embodiment shown in FIG. 1.

In the embodiment, according to the product feature vector of each product image on the product webpage, the product images on the product webpage are divided into at least one image set of the product webpage. As illustrated in FIG. 2, the method includes the following steps.

At step 11, a difference degree between two product feature vectors is determined according to the product feature vector of each product image on the product webpage.

In the embodiment, a similarity between corresponding product images is represented by the difference degree between the product feature vectors. The larger the difference degree, the smaller the similarity, and the smaller the difference, the larger the similarity.

In the embodiment, a cosine distance between two product feature vectors is used as an example to describe the difference degree between the two product feature vectors.

It is understood that the difference degree between two product feature vectors may also be measured by other distances between the two product feature vectors, such as the Euclidean distance, which is not specifically limited in this embodiment.

At step 12, a product feature vector is randomly selected from product feature vectors of the product images as a first reference feature vector.

At step 13, a target product feature vector with a difference degree from the first reference feature vector that is less than a first difference degree threshold is obtained.

In detail, for each product webpage, a target product feature vector is obtained from the product feature vector set of the product webpage, in which the difference degree between the target product feature vector and the first reference feature vector is less than the first difference degree threshold.

In the embodiment, the product feature vector set of the product webpage has a corresponding relation with the target image set of the product webpage.

At step 14, the target product feature vector is determined as the first reference feature vector, and step 13 is continued to be executed until there is no target product feature vector with a difference degree from the first reference feature vector that is less than the first difference degree threshold.

At step 15, the target product image corresponding to the target product feature vector is grouped into one image set.

At step 16, if there are ungrouped product images in the product images on the product webpage, a product feature vector is randomly selected from product feature vectors corresponding to the ungrouped product images as the first reference feature vector (that is, a random selection is performed on the product feature vectors of the ungrouped product image to acquire the first reference feature vector), and step 13 is continued to be executed until there is no target product feature vector with a difference degree from the first reference feature vector that is less than the first difference degree threshold.

That is, in the embodiment, the cosine distance is calculated between any two of the product feature vectors of all the images on the currently processed product webpage, and a product feature vector is randomly determined as the first reference product feature vector, and all product feature vectors with difference degrees from the first reference feature vector that are less than the first difference degree threshold are found, and then searching is performed on the found product feature vectors to determine, for a certain one of the found product feature vector, product feature vectors with a distance from the certain found product feature vector that is less than a certain threshold, and this progress is iterated, and finally found images are grouped into an image set. The above search operation is also performed on the remaining ungrouped images, and finally a plurality of image sets of the currently processed product webpage are obtained. The image set with the maximum image data is selected from the plurality of image sets as the target image set of the currently processed product webpage.

In the embodiment, in order to save the storage space of images, all other image sets except for the target image set are deleted.

At step 103, an average product feature vector of the target image set is determined according to product feature vectors of the product images in the target image set of the product webpage.

In detail, for the target image set of each product webpage, the product feature vectors of the product images in the corresponding target image set may be averaged to obtain the average product feature vector of the corresponding target image set. That is, the average product feature vector in the embodiment is calculated by averaging the product feature vectors of all the product images in the corresponding product image set.

It is understood that, in practical applications, there may be cases where several product webpages are adopted to sell the same product in an e-commerce website. Therefore, in the embodiment, it is necessary to combine the product webpages.

At step 104, target image sets of the product webpages are classified according to the average product feature vector to obtain at least one type of image set.

Figure 3:
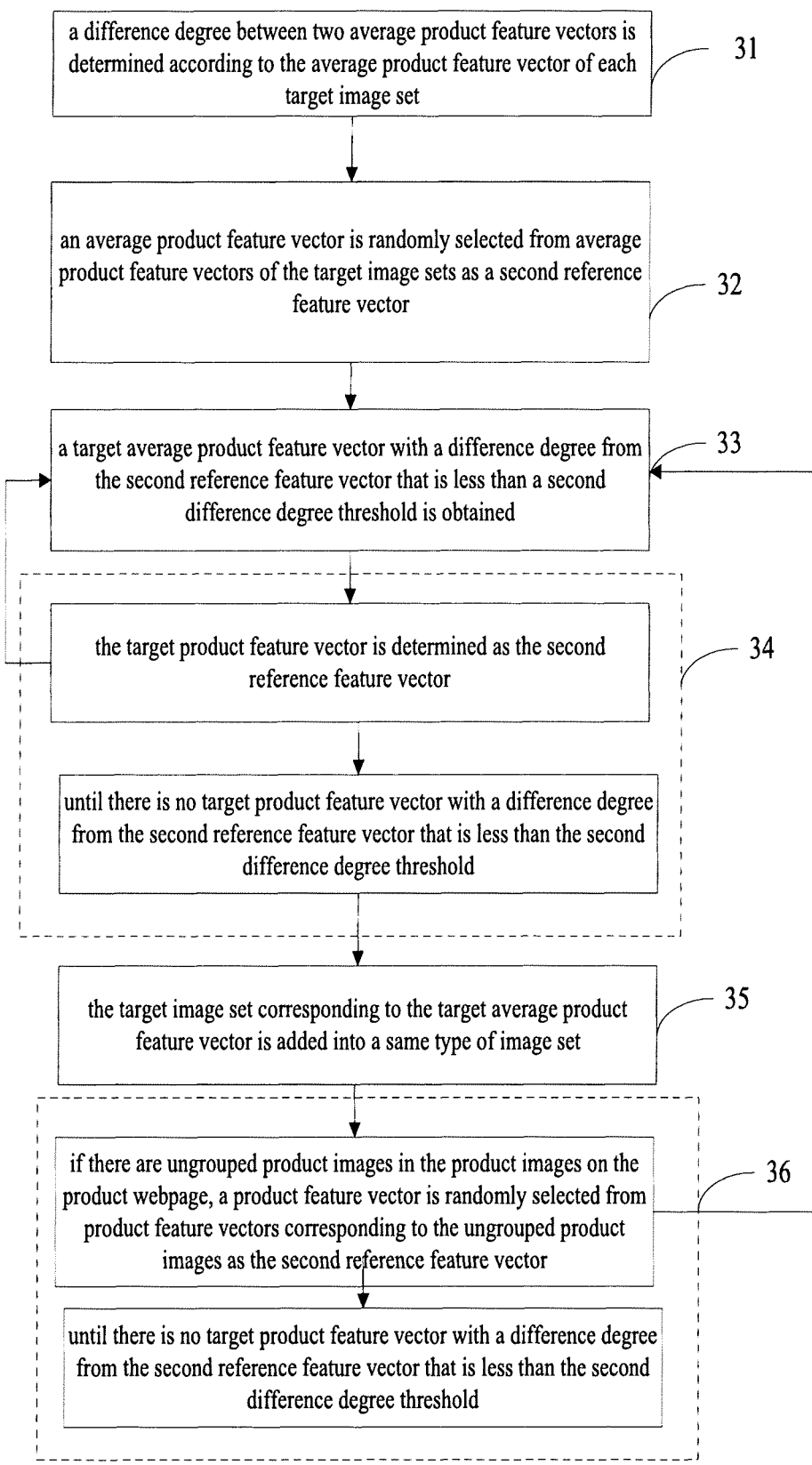
FIG. 3 is a detailed flowchart of step 104 in the embodiment shown in FIG. 1.

In the embodiment, according to the average product feature vector, the target image sets of the product webpage are classified to obtain the at least one type of image set. As illustrated in FIG. 3, the method may include the following steps.

At step 31, a difference degree between two average product feature vectors is determined according to the average product feature vector of each target image set.

At step 32, an average product feature vector is randomly selected from average product feature vectors of the target image sets as a second reference feature vector.

At step 33, a target average product feature vector with a difference degree from the second reference feature vector that is less than a second difference degree threshold is obtained.

In detail, a target average product feature vector is obtained from all the product average feature vectors, in which the difference degree between the target average product feature vector and the second reference feature vector is less than the second difference degree threshold.

At step 34, the target average product feature vector is determined as the second reference feature vector, and step 33 is continued to be executed until there is no target product feature vector with a difference degree from the second reference feature vector that is less than the second difference degree threshold.

At step 35, the target image sets corresponding to the target average product feature vector are grouped into a same type of image set.

At step 36, if there are ungrouped product images in the product images on the product webpage, a product feature vector is randomly selected from product feature vectors corresponding to the ungrouped product images as the second reference feature vector, and step 33 is continued to be executed until there is no target product feature vector with a difference degree from the second reference feature vector that is less than the second difference degree threshold.

At step 105, the product training images are generated according to the at least one type of image set.

In the embodiment, in different application scenarios, manners of generating product training images according to at least one type of image set are different. Examples are taken as follows.

As a possible implementation, a product category of each type of image set is determined according to the product images in each type of image set, and a preset number of product images are randomly selected from each type of image set as the product training images corresponding to the product category.

As another possible implementation, all product images in each type of image set may be used as a type of product training images, a product category of each type of image set is determined according to the product images in each type of image set, and the product category corresponding to the corresponding image set is used as the product category of the corresponding product training image.

In the embodiment, after obtaining the product training image and the product category of the product training image, the product recognition model may be trained according to the product training image and the product category of the product training image to obtain a trained product recognition model.

In the embodiment, after obtaining the trained product recognition model, the product image to be processed which is uploaded by the user is identified according to the trained product recognition model to determine the product category of the product image to be processed, and the user is provided with a list of products according to the product category. It is convenient for users to quickly obtain products that meet their needs according to the provided product list.

With the method for obtaining product training images, after all product images on each of product webpages in an e-commerce website are obtained, by considering a product feature vector of each product image on each product webpage, all the product images on the corresponding product webpage are divided into at least one image set of the product webpage, and the product webpage with the largest number of product images is determined from the at least one image set as a target image set. After that, by considering product feature vectors of the product images in the target image set of each product webpage, an average product feature vector of each target image set is determined. Moreover, according to the average product feature vector, target image sets of all product webpages are classified to obtain at least one type of image set. The product training images are generated according to the at least one type of image set. Therefore, with the proposed method, all product images on the product webpage are combined considered to generate product training images, which can may quickly obtain such that a large number of training images consistent with the distribution of real scene are obtained quickly, thereby reducing the trouble of manually generating training images consistent with the distribution of real scene, and improving efficiency of obtaining training images consistent with the distribution of real scene, thus a good product recognition model for product recognition may be trained.

Figure 4:
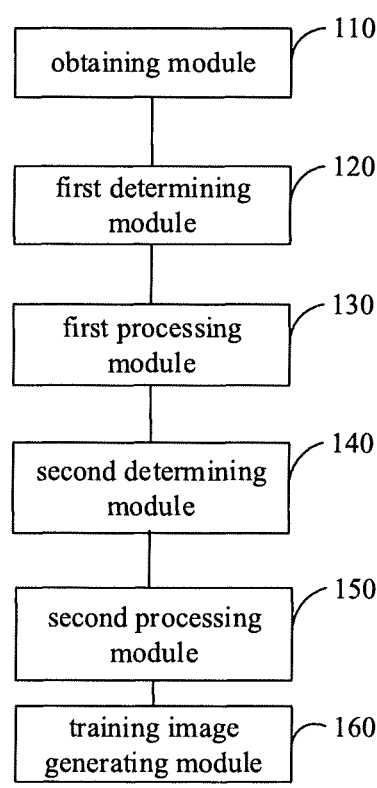
FIG. 4 is a schematic diagram of an apparatus for obtaining product training images according to an embodiment of the present disclosure.

In order to implement the foregoing embodiments, the embodiments of the present disclosure provide a device for obtaining product training images. FIG. 4 is a schematic diagram of an apparatus for obtaining product training images according to an embodiment of the present disclosure.

As illustrated in FIG. 4, the apparatus for obtaining product training images includes: an obtaining module 110, configured to obtain product images on each of product webpages in an e-commerce website; a first determining module 120, configured to determine a product feature vector of each product image on the product webpage; a first processing module 130, configured to, for each product webpage, according to the product feature vector of each product image on the product webpage, divide the product images on the product webpage into at least one image set of the product webpage, and determine a target image set of the product webpage with the largest number of product images from the at least one image set; a second determining module 140, configured to determine an average product feature vector of the target image set according to product feature vectors of the product images in the target image set of the product webpage; a second processing module 150, configured to classify target image sets of the product webpages according to the average product feature vector to obtain at least one type of image set; and a training image generating module 160, configured to generate the product training images according to the at least one type of image set.

In the embodiment, the first determining module 120 is configured to: for each product webpage, perform a product main body detection on each product image on the product webpage to obtain a product main body area of each product image; and according to a preset product model, perform a feature extraction on the product main body area of each product image to obtain the product feature vector of each product image.

In the embodiment, the first processing module 130 is configured to: determine a difference degree between two product feature vectors according to the product feature vector of each product image on the product webpage; randomly select a product feature vector from product feature vectors of the product images as a first reference feature vector; obtain a target product feature vector with a difference degree from the first reference feature vector that is less than a first difference degree threshold; determine the target product feature vector as the first reference feature vector, and continue to obtain a target product feature vector with a difference degree from the first reference feature vector that is less than the first difference degree threshold, until there is no target product feature vector with a difference degree from the first reference feature vector that is less than the first difference degree threshold; add the target product image corresponding to the target product feature vector into one image set; and if there are ungrouped product images in the product images on the product webpage, randomly select a product feature vector from product feature vectors corresponding to the ungrouped product images as the first reference feature vector, and continue to obtain a target product feature vector with a difference degree from the first reference feature vector that is less than the first difference degree threshold until there is no target product feature vector with a difference degree from the first reference feature vector that is less than the first difference degree threshold.

In the embodiment, the second processing module 150 is configured to: determine a difference degree between two average product feature vectors according to the average product feature vector of each target image set; randomly select an average product feature vector from average product feature vectors of the target image sets as a second reference feature vector; obtain a target average product feature vector with a difference degree from the second reference feature vector that is less than a second difference degree threshold; determine the target average product feature vector as the second reference feature vector, and continue to obtain a target average product feature vector with a difference degree from the second reference feature vector that is less than the second difference degree threshold until there is no target average product feature vector with a difference degree from the second reference feature vector that is less than the second difference degree threshold; add the target image set corresponding to the target average product feature vector into a same type of image set; if there are ungrouped target image sets, randomly select an average product feature vector from average product feature vectors corresponding to the ungrouped target image sets as the second reference feature vector, and continue to obtain a target average product feature vector with a difference degree from the second reference feature vector that is less than the second difference degree threshold until there is no target average product feature vector with a difference degree from the second reference feature vector that is less than the second difference degree threshold.

In the embodiment, the training image generating module 160 is configured to: determine a product category of each type of image set according to the product images in each type of image set; and randomly select a preset number of product images from each type of image set as the product training images corresponding to the product category.

In the embodiment, the product images include a product main image, or a product main image and an image of a purchased product.

It is noted that the above-mentioned explanation of the method for obtaining product training images is also applicable for the apparatus for obtaining product training images in the embodiment, which is not repeated here.

With the apparatus for obtaining product training images according to embodiments of the present disclosure, after all product images on each of product webpages in an e-commerce website are obtained, by considering a product feature vector of each product image on each product webpage, all the product images on the corresponding product webpage are divided into at least one image set of the product webpage, and the product webpage with the largest number of product images is determined from the at least one image set as a target image set. After that, by considering product feature vectors of the product images in the target image set of each product webpage, an average product feature vector of each target image set is determined.

Moreover, according to the average product feature vector, target image sets of all product webpages are classified to obtain at least one type of image set. The product training images are generated according to the at least one type of image set. Therefore, with the proposed method, all product images on the product webpage are combined considered to generate product training images, which can may quickly obtain such that a large number of training images consistent with the distribution of real scene are obtained quickly, thereby reducing the trouble of manually generating training images consistent with the distribution of real scene, and improving efficiency of obtaining training images consistent with the distribution of real scene, thus a good product recognition model for product recognition may be trained.

In order to realize the aforementioned embodiments, the present disclosure also provides a computer device, including a processor and a memory. The processor runs a program corresponding to an executable program code by reading the executable program code stored in the memory, such that the method for obtaining product training images is implemented.

Figure 5:
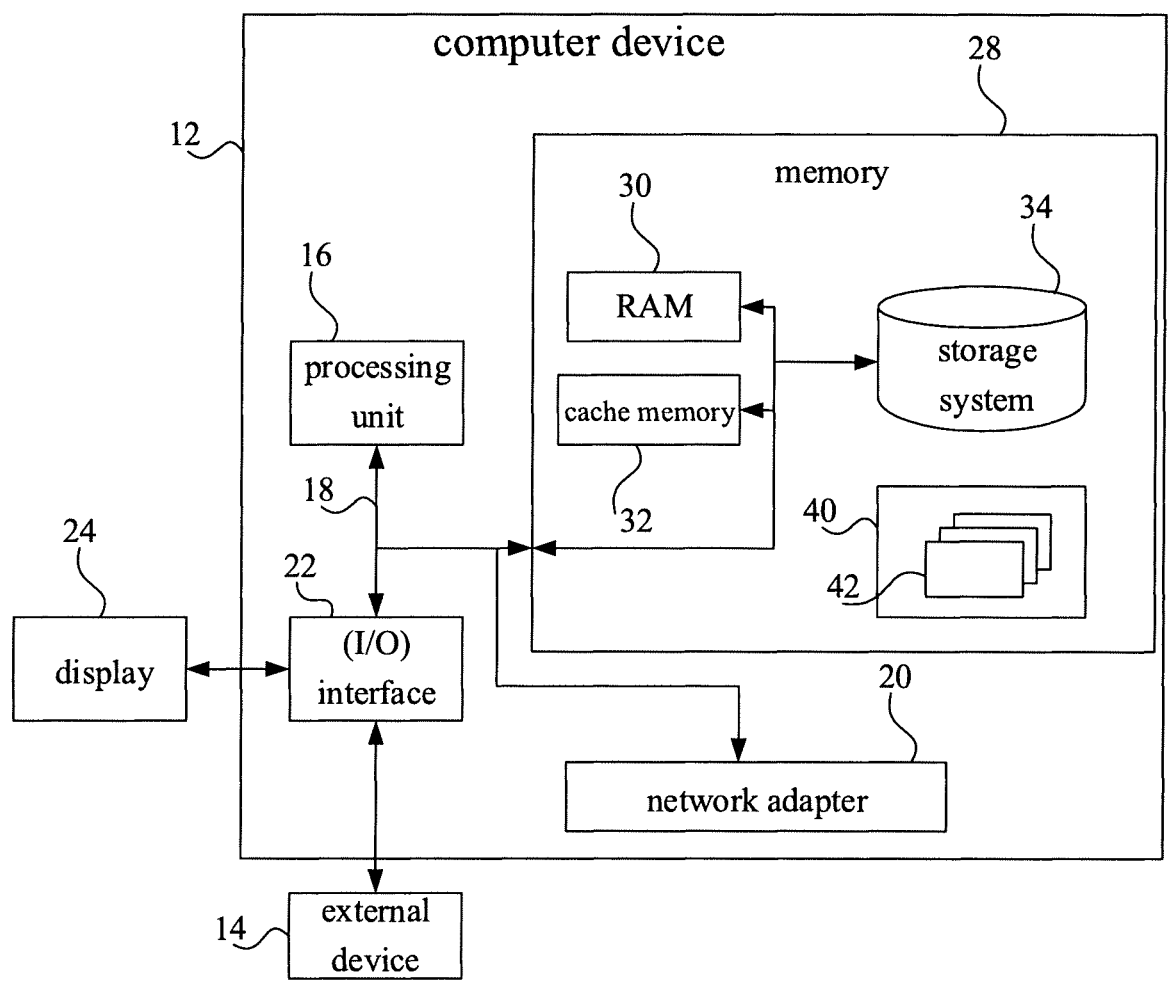
FIG. 5 is a block diagram of an exemplary computer device suitable for implementing embodiments of the present disclosure.

FIG. 5 is a block diagram of an exemplary computer device suitable for implementing embodiments of the present disclosure. The computer device 12 shown in FIG. 5 is merely an example, and should not impose any limitation on the functions and scope of use of the embodiments of the present disclosure.

As illustrated in FIG. 5, the computer device 12 is represented in the form of a general-purpose computing device. The components of the computer device 12 may include, but are not limited to, one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The computer device 12 typically includes various computer system readable mediums. These mediums may be any usable medium that may be accessed by the computer device 12, including volatile and non-volatile mediums, removable and non-removable mediums.

The system memory 28 may include computer system readable mediums in the form of volatile medium, such as a RAM (Random Access Memory) 30 and/or a cache memory 32. The computer device 12 may further include other removable/non-removable, volatile/non-volatile computer system storage mediums. Only as an example, the storage system 34 may be configured to read from and write to non-removable, non-volatile magnetic mediums (not illustrated in FIG. 5, and usually called "a hard disk driver"). Although not illustrated in FIG. 5, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The computer device 12 may communicate with one or more external devices 14 (such as a keyboard, a pointing device, and a display 24), may further communicate with one or more devices enabling a user to interact with the device, and/or may communicate with any device (such as a network card, and a modem) enabling the computer device 12 to communicate with one or more other computer devices. Such communication may occur via an Input/Output (I/O) interface 22. Moreover, the computer device 12 may further communicate with one or more networks (such as LAN (Local Area Network), WAN (Wide Area Network) and/or public network, such as Internet) via a network adapter 20. As illustrated, the network adapter 20 communicates with other modules of the computer device 12 via the bus 18. It should be understood that, although not illustrated, other hardware and/or software modules may be used in combination with the computer device 12, including but not limited to: microcode, device drivers, redundant processing units, external disk drive arrays, RAID (Redundant Array of Independent Disks) systems, tape drives, and data backup storage systems, etc.

The processing unit 16, by operating programs stored in the system memory 28, executes various function applications and data processing, for example implements the high-precision map generation method provided in embodiments of the present disclosure.

In order to implement the above embodiments, an embodiment of the present disclosure further provides a non-transitory computer-readable storage medium on which a computer program is stored. When the program is executed by a processor, the method for obtaining product training images according to the foregoing embodiment is implemented.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications may be made in the embodiments without departing from scope of the present disclosure.

What is claimed is:

1. A method for obtaining product training images, comprising:

obtaining product images on each of product webpages in an e-commerce website, and determining a product feature vector of each product image on the product webpage;

for each product webpage, according to the product feature vector of each product image on the product webpage, dividing the product images on the product webpage into at least one image set of the product webpage, and determining a target image set of the product webpage with the largest number of product images from the at least one image set;

determining an average product feature vector of the target image set according to product feature vectors of the product images in the target image set of the product webpage;

classifying target image sets of the product webpages according to the average product feature vector to obtain at least one type of image set; and generating the product training images according to the at least one type of image set, wherein according to the product feature vector of each product image on the product webpage, dividing the product images on the product webpage into at least one image set of the product webpage, comprises:

determining a difference degree between two product feature vectors according to the product feature vector of each product image on the product webpage;

randomly selecting a product feature vector from product feature vectors of the product images as a first reference feature vector;

obtaining a target product feature vector with a difference degree from the first reference feature vector that is less than a first difference degree threshold;

determining the target product feature vector as the first reference feature vector, and continuing to obtain a target product feature vector with a difference degree from the first reference feature vector that is less than the first difference degree threshold, until there is no target product feature vector with a difference degree from the first reference feature vector that is less than the first difference degree threshold;

adding the target product image corresponding to the target product feature vector into one image set; and if there are ungrouped product images in the product images on the product webpage, randomly selecting a product feature vector from product feature vectors corresponding to the ungrouped product images as the first reference feature vector, and continuing to obtain a target product feature vector with a difference degree from the first reference feature vector that is less than the first difference degree threshold until there is no target product feature vector with a difference degree from the first reference feature vector that is less than the first difference degree threshold.

2. The method according to claim 1, wherein determining the product feature vector of each product image on the product webpage comprises:

for each product webpage, performing a product main body detection on each product image on the product webpage to obtain a product main body area of each product image; and according to a preset product model, performing a feature extraction on the product main body area of each product image to obtain the product feature vector of each product image.

3. The method according to claim 1, wherein classifying the target image sets of the product webpages according to the average product feature vector to obtain the at least one type of image set, comprises:

determining a difference degree between two average product feature vectors according to the average product feature vector of each target image set;

randomly selecting an average product feature vector from average product feature vectors of the target image sets as a second reference feature vector;

obtaining a target average product feature vector with a difference degree from the second reference feature vector that is less than a second difference degree threshold;

determining the target average product feature vector as the second reference feature vector, and continuing to obtain a target average product feature vector with a difference degree from the second reference feature vector that is less than the second difference degree threshold until there is no target average product feature vector with a difference degree from the second reference feature vector that is less than the second difference degree threshold;

adding the target image set corresponding to the target average product feature vector into a same type of image set;

if there are ungrouped target image sets, randomly selecting an average product feature vector from average product feature vectors corresponding to the ungrouped target image sets as the second reference feature vector, and continuing to obtain a target average product feature vector with a difference degree from the second reference feature vector that is less than the second difference degree threshold until there is no target average product feature vector with a difference degree from the second reference feature vector that is less than the second difference degree threshold.

4. The method according to claim 1, wherein generating the product training images according to the at least one type of image set comprises:

determining a product category of each type of image set according to the product images in each type of image set; and randomly selecting a preset number of product images from each type of image set as the product training images corresponding to the product category.

5. The method according to claim 1, wherein the product images comprise a product main image.

6. The method according to claim 5, wherein the product images comprise an image of a purchased product.

7. An apparatus for obtaining product training images, comprising:

one or more processors;

a memory storing instructions executable by the one or more processors;

wherein the one or more processors are configured to:

obtain product images on each of product webpages in an e-commerce website;

determine a product feature vector of each product image on the product webpage;

for each product webpage, according to the product feature vector of each product image on the product webpage, divide the product images on the product webpage into at least one image set of the product webpage, and determine a target image set of the product webpage with the largest number of product images from the at least one image set;

determine an average product feature vector of the target image set according to product feature vectors of the product images in the target image set of the product webpage;

classify target image sets of the product webpages according to the average product feature vector to obtain at least one type of image set; and generate the product training images according to the at least one type of image set, wherein the one or more processors are configured to:

determine a difference degree between two product feature vectors according to the product feature vector of each product image on the product webpage;

randomly select a product feature vector from product feature vectors of the product images as a first reference feature vector;

obtain a target product feature vector with a difference degree from the first reference feature vector that is less than a first difference degree threshold;

determine the target product feature vector as the first reference feature vector and continue to obtain a target product feature vector with a difference degree from the first reference feature vector that is less than the first difference degree threshold, until there is no target product feature vector with a difference degree from the first reference feature vector that is less than the first difference degree threshold;

add the target product image corresponding to the target product feature vector into one image set; and if there are ungrouped product images in the product images on the product webpage, randomly select a product feature vector from product feature vectors corresponding to the ungrouped product images as the first reference feature vector, and continue to obtain a target product feature vector with a difference degree from the first reference feature vector that is less than the first difference degree threshold until there is no target product feature vector with a difference degree from the first reference feature vector that is less than the first difference degree threshold.

8. The apparatus according to claim 7, wherein the one or more processors are configured to:
for each product webpage, perform a product main body detection on each product image on the product webpage to obtain a product main body area of each product image; and
according to a preset product model, perform a feature extraction on the product main body area of each product image to obtain the product feature vector of each product image.

9. The apparatus according to claim 7, wherein the one or more processors are configured to:
determine a difference degree between two average product feature vectors according to the average product feature vector of each target image set;
randomly select an average product feature vector from average product feature vectors of the target image sets as a second reference feature vector;
obtain a target average product feature vector with a difference degree from the second reference feature vector that is less than a second difference degree threshold;
determine the target average product feature vector as the second reference feature vector, and continue to obtain a target average product feature vector with a difference degree from the second reference feature vector that is less than the second difference degree threshold until there is no target average product feature vector with a difference degree from the second reference feature vector that is less than the second difference degree threshold;
add the target image set corresponding to the target average product feature vector into a same type of image set;
if there are ungrouped target image sets, randomly select an average product feature vector from average product feature vectors corresponding to the ungrouped target image sets as the second reference feature vector, and continue to obtain a target average product feature vector with a difference degree from the second reference feature vector that is less than the second difference degree threshold until there is no target average product feature vector with a difference degree from the second reference feature vector that is less than the second difference degree threshold.

10. The apparatus according to claim 7, wherein the one or more processors are configured to:
determine a product category of each type of image set according to the product images in each type of image set; and
randomly select a preset number of product images from each type of image set as the product training images corresponding to the product category.

11. The apparatus according to claim 7, wherein the product images comprise a product main image.

12. The apparatus according to claim 11, wherein the product images comprise an image of a purchased product.

13. A non-transitory computer-readable storage medium having a computer program stored thereon, wherein when the program is executed by a processor, a method for obtaining product training images is implemented, and the method comprises:
obtaining product images on each of product webpages in an e-commerce website, and determining a product feature vector of each product image on the product webpage;
for each product webpage, according to the product feature vector of each product image on the product webpage, dividing the product images on the product webpage into at least one image set of the product webpage, and determining a target image set of the product webpage with the largest number of product images from the at least one image set;
determining an average product feature vector of the target image set according to product feature vectors of the product images in the target image set of the product webpage;
classifying target image sets of the product webpages according to the average product feature vector to obtain at least one type of image set; and
generating the product training images according to the at least one type of image set, wherein according to the product feature vector of each product image on the product webpage, dividing the product images on the product webpage into at least one image set of the product webpage, comprises:
determining a difference degree between two product feature vectors according to the product feature vector of each product image on the product webpage;
randomly selecting a product feature vector from product feature vectors of the product images as a first reference feature vector;
obtaining a target product feature vector with a difference degree from the first reference feature vector that is less than a first difference degree threshold;
determining the target product feature vector as the first reference feature vector, and continuing to obtain a target product feature vector with a difference degree from the first reference feature vector that is less than the first difference degree threshold, until there is no target product feature vector with a difference degree from the first reference feature vector that is less than the first difference degree threshold;
adding the target product image corresponding to the target product feature vector into one image set; and
if there are ungrouped product images in the product images on the product webpage, randomly selecting a product feature vector from product feature vectors corresponding to the ungrouped product images as the first reference feature vector, and continuing to obtain a target product feature vector with a difference degree from the first reference feature vector that is less than the first difference degree threshold until there is no target product feature vector with a difference degree from the first reference feature vector that is less than the first difference degree threshold.

* * * * *